US006978451B2

(12) United States Patent
Heeb

(10) Patent No.: US 6,978,451 B2
(45) Date of Patent: *Dec. 20, 2005

(54) METHOD FOR FAST COMPILATION OF PREVERIFIED JAVA BYTECODE TO HIGH QUALITY NATIVE MACHINE CODE

(75) Inventor: Beat Heeb, Zurich (CH)

(73) Assignee: Esmertec AG, Dubendorf (CH)

( * ) Notice: Subject to any disclaimer, the term of this patent is extended or adjusted under 35 U.S.C. 154(b) by 657 days.

This patent is subject to a terminal disclaimer.

(21) Appl. No.: 10/014,742

(22) Filed: Oct. 30, 2001

(65) Prior Publication Data

US 2004/0015913 A1 Jan. 22, 2004

Related U.S. Application Data

(60) Provisional application No. 60/294,913, filed on May 31, 2001.

(51) Int. Cl.[7] ............................................... G06F 9/45
(52) U.S. Cl. ........................................ 717/154; 717/148
(58) Field of Search ................................. 717/140, 146, 717/148, 136, 139, 118, 126, 114, 116, 151–153, 154

(56) References Cited

U.S. PATENT DOCUMENTS

| | | | | |
|---|---|---|---|---|
| 5,590,331 A | | 12/1996 | Lewis et al. ................ 395/708 |
| 5,630,066 A | * | 5/1997 | Gosling ....................... 709/221 |
| 5,668,999 A | * | 9/1997 | Gosling ....................... 717/126 |
| 5,692,047 A | | 11/1997 | McManis ....................... 380/4 |
| 5,740,441 A | | 4/1998 | Yellin et al. ................ 395/704 |
| 5,748,964 A | * | 5/1998 | Gosling ....................... 717/126 |
| 5,815,661 A | * | 9/1998 | Gosling ....................... 709/216 |
| 5,848,274 A | | 12/1998 | Hamby et al. ............... 395/705 |
| 5,909,579 A | | 6/1999 | Agesen et al. ............... 395/704 |
| 5,970,249 A | | 10/1999 | Holzle et al. ............... 395/705 |
| 5,978,586 A | | 11/1999 | Baisley et al. .............. 395/705 |
| 5,999,731 A | | 12/1999 | Yellin et al. ................ 395/704 |
| 6,052,732 A | | 4/2000 | Gosling |
| 6,058,482 A | | 5/2000 | Liu ............................. 713/201 |
| 6,070,239 A | | 5/2000 | McManis ..................... 713/187 |
| 6,075,940 A | * | 6/2000 | Gosling ....................... 717/126 |
| 6,092,147 A | | 7/2000 | Levy et al. ..................... 711/6 |
| 6,110,226 A | | 8/2000 | Bothner ......................... 717/7 |
| 6,139,199 A | | 10/2000 | Rodriguez .................... 395/709 |
| 6,151,703 A | | 11/2000 | Crelier .......................... 717/5 |
| 6,170,083 B1 | | 1/2001 | Adl-Tabatabai |
| 6,473,777 B1 | * | 10/2002 | Hendler et al. .............. 707/206 |
| 2003/0084431 A1 | | 5/2003 | Kobayashi |
| 2003/0084432 A1 | | 5/2003 | Kobayashi |

OTHER PUBLICATIONS

Azevedo–Nicolau–Hummel, Java Annotation–Aware Just–In–Time (AJIT) Compilation System, Jun. 1999, http://www.cs.ucsb.edu/conferences/java99/papers/63–azevedo.pdf.*

Alpern et al., The Jalapeno virtual machine, 2000, IBM Systems Journal, vol. 39, No. 1, 2000.*

(Continued)

Primary Examiner—Antony Nguyen-Ba
(74) Attorney, Agent, or Firm—Brian R. Coleman; Perkins Coie LLP

(57) ABSTRACT

The present invention is a new method and apparatus to perform fast compilation of platform independent bytecode instruction listings into high quality machine code in a single sequential pass. More specifically, the present invention creates a new method and apparatus for the translation of platform neutral bytecode into high quality machine code in a single sequential pass in which information from the preceding instruction translation is used to mimic an optimizing compiler without the extensive memory and time requirements. Where the preceding instruction translation cannot be used due to no direct control flow, information from comprehensive stack maps is then used.

22 Claims, 5 Drawing Sheets

OTHER PUBLICATIONS

Alpern et al., "The Jalapeño Virtual Machine," IBM Systems Journal, vol. 39, No. 1, 2000, pp. 211–238.

Tim Lindholm and Frank Yellin, "The JAVA Virtual Machine Specification—Second Edition", http://java.sun.com/docs/books/vmspec/2$^{nd}$–edition/html/Introduction.doc.html.

Gary McGraw and Ed Felten, "Securing JAVA, Getting Down To Business With Mobil Code", http://www.securingjava.com/chapter–two/chapter–two–6.html.

"The GNU Compiler For The JAVA Programming Language", http://gcc.gnu.org/java/index.html.

Dave Dittrich and Nathan Dors, "JAVA", http://staff.washington.edu/dittrich/talks/java/.

"The JAVA Tutorial", http://java.sun.com/docs/books/tutorial/getStarted/problems/index.html.

"JAVA Optimization" http://www–2.cs.cmu.edu/~jch/java/compilers.html.

Adl–Tabatabai et al.: "Fast, Effective Code Generation in a Just–In–Time Java Compiler", Intel Corporation, May 1998.

Hazi et al.: "Techniques for Obtaining High Performance in Java Programs", ACM Computing Survey, vol. 32, No. 3, Sep. 2000, pp 213–240.

Suganuma et al.: "Overview of the IBM Java Just–In–Time Compiler", IBM Systems Journal, vol. 39, No. 1, 2000.

Per Bothner: "A Gcc–based Java Implementation", 1997 IEEE, pp. 174–178.

Lindholm et al: "The Java Virtual Machine Specification", Addison Wesley, Mountain View, CA, 1997.

* cited by examiner

300 →

| For each value on the bytecode stack | A field showing actual mapping to storage in target machine | Constant |
| | | Local |
| | | Temporary |
| | | Stack |
| | A field containing additional information | Constant Value |
| | | Slot Number |
| | | Register Number |
| For each target of a jump or switch instruction | A field to store native code address | |

FIG. 3

METHOD FOR FAST COMPILATION OF PREVERIFIED JAVA BYTECODE TO HIGH QUALITY NATIVE MACHINE CODE

CROSS REFERENCE TO RELATED APPLICATIONS

This Application claims the benefit of U.S. Provisional Application No. 60/294,913 filed May 31, 2001, which is incorporated herein by reference.

STATEMENT REGARDING FEDERALLY SPONSORED RESEARCH

Not applicable.

BACKGROUND OF INVENTION

1. Field of Invention

The present invention is related to the compilation of platform neutral bytecode computer instructions, such as JAVA, into high quality machine code. More specifically, the present invention discloses a new method of creating high quality machine code from platform neutral bytecode in a single sequential pass in which information from preceding instruction translations is used to mimic an optimizing compiler without the extensive memory and time requirements.

2. Background of Invention

The present invention is related to the compilation of platform neutral bytecode computer The benefit of architecture neutral language such as JAVA is the ability to execute such language on a wide range of systems once a suitable implementation technique, such as a JAVA Virtual Machine, is present. The key feature of the JAVA language is the creation and use of platform neutral bytecode instructions, which create the ability to run JAVA programs, such as applets, applications or servlets, on a broad range of diverse platforms. Typically, a JAVA program is compiled through the use of a JAVA Virtual Machine (JVM) which is merely an abstract computing machine used to compile the JAVA program (or source code) into platform neutral JAVA bytecode instructions, which are then placed into class files. The JAVA bytecode instructions in turn, serve as JVM instructions wherever the JVM is located. As bytecode instructions, the JAVA program may now be transferred to and executed by any system with a compatible JAVA platform. In addition, other languages that are expressed in bytecode instructions, may be compatible with the JVM.

Broadly speaking, computer instructions often are incompatible with other computer platforms. Attempts to improve compatibility include "high level" language software which is not executable without compilation into a machine specific code. As taught by U.S. Pat. No. 5,590,331, issued Dec. 31, 1996 to Lewis et al., several methods of compilation exist for this purpose. For instance, a pre-execution compilation approach may be used to convert "high level" language into machine specific code prior to execution. On the other hand, a runtime compilation approach may be used to convert instructions and immediately send the machine specific code to the processor for execution. A JAVA program requires a compilation step to create bytecode instructions, which are placed into class files. A class file contains streams of 8-bit bytes either alone or combined into larger values, which contain information about interfaces, fields or methods, the constant pool and the magic constant. Placed into class files, bytecode is an intermediate code, which is independent of the platform on which it is later executed. A single line of bytecode contains a one-byte opcode and either zero or additional bytes of operand information. Bytecode instructions may be used to control stacks, the VM register arrays or transfers. A JAVA interpreter is then used to execute the compiled bytecode instructions on the platform.

The compilation step is accomplished with multiple passes through the bytecode instructions, where during each pass, a loop process is employed in which a method loops repeatedly through all the bytecode instructions. A single bytecode instruction is analyzed during each single loop through the program and after each loop, the next loop through the bytecode instructions analyzes the next single bytecode instruction. This is repeated until the last bytecode instruction is reached and the loop is ended.

During the first compilation pass, a method loops repeatedly through all the bytecode instructions and a single bytecode instruction is analyzed during each single loop through the program. If it is determined the bytecode instruction being analyzed is the last bytecode instruction, the loop is ended. If the bytecode instruction being analyzed is not the last bytecode instruction, the method determines stack status from the bytecode instruction and stores this in stack status storage, which is updated for each bytecode instruction. This is repeated until the last bytecode instruction is reached and the loop is ended.

During the second compilation pass, a method loops repeatedly through all the bytecode instructions once again and a single bytecode instruction is analyzed during each single loop through the program. If it is determined the bytecode instruction being analyzed is the last bytecode instruction, the loop is ended. If the bytecode instruction being analyzed is not the last bytecode instruction, the stack status storage and bytecode instruction are used to translate the bytecode instruction into machine code. This is repeated until the last bytecode instruction is translated and the loop is ended.

A JAVA program however, also requires a verification step to ensure malicious or corrupting code is not present. As with most programming languages, security concerns are addressed through verification of the source code. JAVA applications ensure security through a bytecode verification process which ensures the JAVA code is valid, does not overflow or underflow stacks, and does not improperly use registers or illegally convert data types. The verification process traditionally consists of two parts achieved in four passes. First, verification performs internal checks during the first three passes, which are concerned solely with the bytecode instructions. The first pass checks to ensure the proper format is present, such as bytecode length. The second pass checks subclasses, superclasses and the constant pool for proper format. The third pass actually verifies the bytecode instructions. The fourth pass performs runtime checks, which confirm the compatibility of the bytecode instructions.

As stated, verification is a security process, which is accomplished through several passes. The third pass in which actual verification occurs, employs a loop process similar to the compilation step in which a method loops repeatedly through all the bytecode instructions and a single bytecode instruction is analyzed during each single loop through the program. After each loop, the next loop through the bytecode instructions analyzes the next single bytecode instruction which is repeated until the last bytecode instruction is reached and the loop is ended.

During the verification pass, the method loops repeatedly through all the bytecode instructions and a single bytecode instruction is analyzed during each single loop through the program. If it is determined the bytecode instruction being analyzed is the last bytecode instruction, the loop is ended. If the bytecode instruction is not the last bytecode instruction, the position of the bytecode instruction being analyzed is determined. If the bytecode instruction is at the beginning of a piece of code that is executed contiguously (a basic block), the global stack status is read from bytecode auxiliary data and stored. After storage, it is verified that the stored global stack status is compliant with the bytecode instruction. If however, the location of the bytecode instruction being analyzed is not at the beginning of a basic block, the global stack status is not read but is verified to ensure the global stack status is compliant with the bytecode instruction. After verifying that the global stack status is compliant with the bytecode instruction, the global stack status is changed according to the bytecode instruction. This procedure is repeated during each loop until the last bytecode instruction is analyzed and the loop ended.

It may be noted that the pass through the bytecode instructions that is required for verification closely resembles the first compilation pass. Duplicate passes during execution can only contribute to the poor speed of JAVA programs, which in some cases may be up to 20 times slower than other programming languages such as C. The poor speed of JAVA programming is primarily the result of verification. In the past, attempts to improve speed have included compilation during idle times and pre-verification. In U.S. Pat. No. 5,970,249 issued Oct. 19, 1999 to Holzle et al., a method is taught in which program compilation is completed during identified computer idle times. And in U.S. Pat. No. 5,999,731 issued Dec. 7, 1999 to Yellin et al. the program is pre-verified, allowing program execution without certain determinations such as stack overflow or underflow checks or data type checks. Both are attempts to improve execution speed by manipulation of the compilation and verification steps. In order to further improve speed, a method and apparatus is needed that can combine these separate, yet similar steps, the verification pass, and the first and second compilation pass, into a step which accomplishes the multiple tasks in substantially less time.

SUMMARY

A technique for fast compilation of bytecode involves sequentially processing the bytecode in a single sequential pass in which information from preceding instruction translations is used to perform the same optimizing process of an optimizing compiler without the extensive memory and time requirements. The system for implementing the technique may include a development or target computer system including a computer readable storage medium with a compilation program included therein. One or more class files having one or more methods containing bytecode instruction listings may be compiled using the compilation program.

An example of such a compilation program includes multiple instruction sets. A first instruction set may, for example, be configured to select a first class to compile. A second instruction set may, for example, be configured to select a first method of the first class to compile. A third instruction set may, for example, be configured to select a first instruction to compile. Another instruction set may be for sequentially executing each bytecode instruction of the selected method.

As another example, a first instruction set may, for example, create map storage to store actual mappings and native code addresses. A second instruction set may initialize stack mappings to "empty" and addresses to "unknown". A third instruction set may sequentially select each bytecode instruction in each method of each class file. A fourth instruction set may detect stored stack mappings for the selected bytecode instruction.

As another example, a first instruction set may, for example, detect direct control flow from a bytecode instruction previous to a selected bytecode instruction. A second instruction set may store all stacks and set stack mappings to "stack" if direct control flow from the previous bytecode instruction is detected. A third instruction set may read a stack layout from the stack mappings and set the stack mappings to "stack" if direct control flow is not detected.

As another example, an instruction set may, for example, set a native code address for a bytecode instruction.

As another example, a first instruction set may, for example, detect if an actual instruction is a load constant instruction. A second instruction set may create a new constant stack mapping if the actual instruction is a load constant instruction.

As another example, a first instruction set may, for example, detect if an actual instruction is a load local instruction. A second instruction set may create a new local stack mapping if the actual instruction is a load local instruction.

As another example, a first instruction set may, for example, detect if an actual instruction is a stack manipulating instruction. A second instruction set may duplicate or reorder a stack mapping according to the stack manipulating instruction.

As another example, a first instruction set may, for example, detect if an actual instruction is a jump or switch instruction. A second instruction set may emit code using stack mapping information if the actual instruction is a lump or switch instruction. A third instruction set may store unused stack values.

As another example, a first instruction set may, for example, detect if an actual instruction is some other instruction. A second instruction set may emit code using stack mapping information if the actual instruction is some other instruction.

As another example, a first instruction set may, for example, select a next instruction. A second instruction set may select a next method. A third instruction set may select a next class file.

A method implementing the technique may, for example, include receiving a bytecode listing onto a computer readable medium containing compilation procedure instructions, executing the compilation procedure instructions to sequentially processing each bytecode of the bytecode listing, and produce native machine code on the computer readable medium, using preceding translation information to optimize the native machine code.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. The embodiments and figures are illustrative rather than limiting; they provide examples of the invention. The invention is limited only by the claims.

FIG. 3 depicts a conceptual view of data structures for use with the new method.

DETAILED DESCRIPTION OF PRESENTLY PREFERRED EXEMPLARY EMBODIMENTS

It is the object of the present invention to create a method and apparatus which may be used to compile platform independent bytecode into high quality native machine code without the extensive memory and execution time requirements of an optimizing compiler. The present invention produces the fast and simple translation associated with simple translators, but with a resulting translation equivalent to the high quality output associated with the more complex optimizing compiler. The new method consists of a program instruction set which executes fewer passes through a bytecode instruction listing where complete compilation into high quality native machine code is achieved in less time and requiring less memory.

The new method translates bytecode instruction listings into native machine code in a single sequential pass. Each bytecode instruction is handled sequentially using information remembered from the translation of preceding bytecode instructions. However, where no direct control flow from the previous instruction prevents information from preceding instructions to be used, information extracted from the stack maps contained in all preverified class files may be used instead.

Figure 1A:
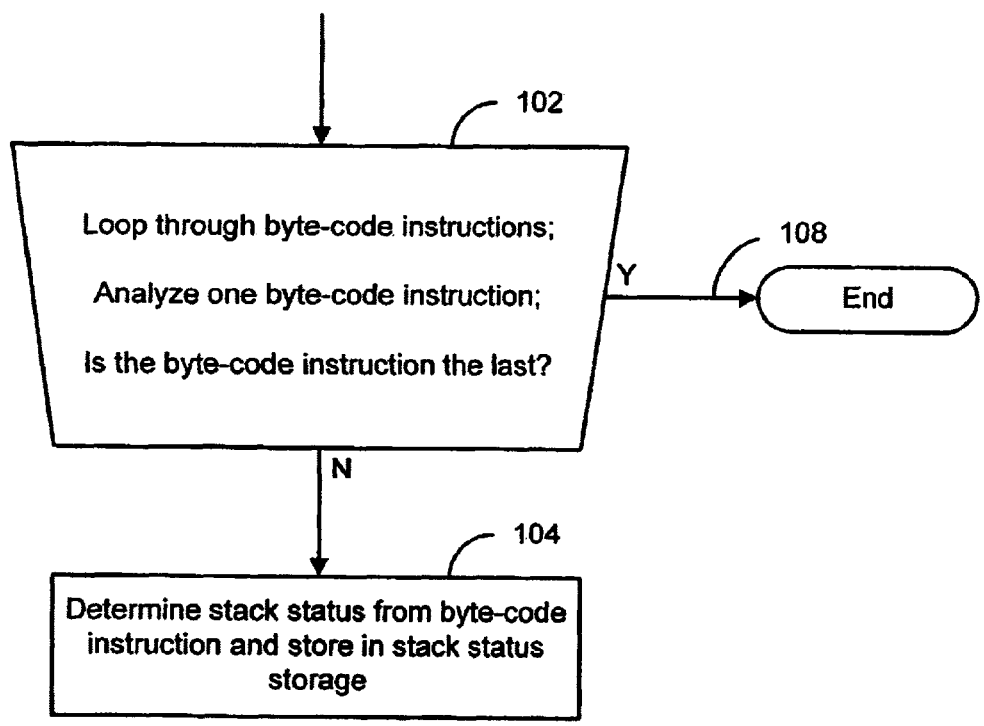
FIG. 1A (Prior Art) depicts a flowchart of traditional bytecode instruction first pass compilation.
Figure 1B:
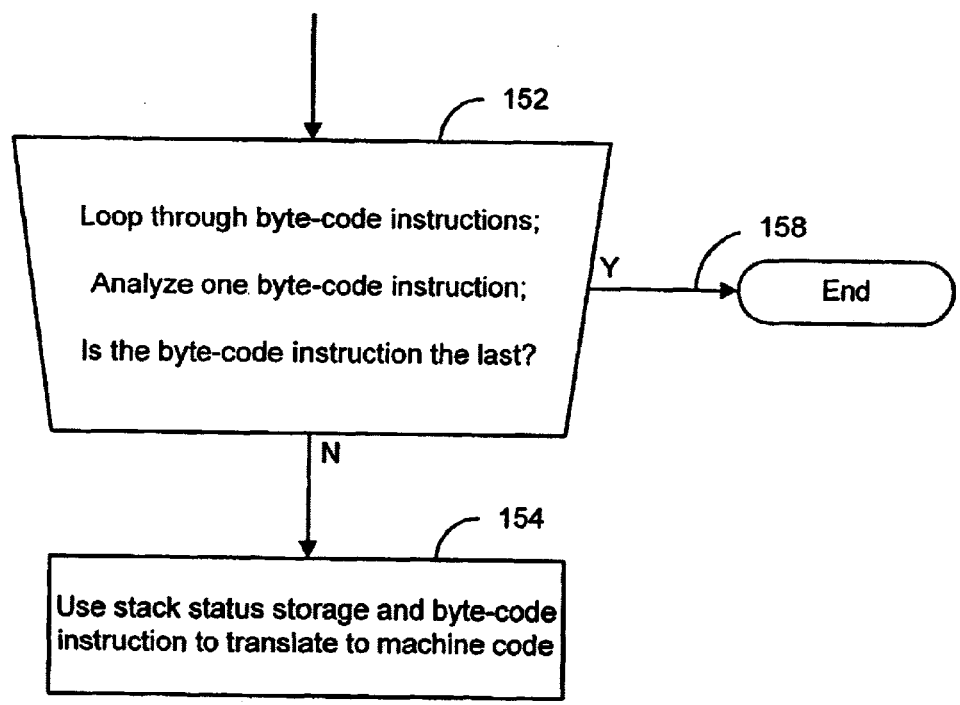
FIG. 1B (Prior Art) depicts a flowchart of traditional bytecode instruction second pass compilation.

In prior art FIGS. 1A and 1B, an illustrative flow diagram of a simple bytecode translator compilation method is shown. In prior art FIG. 1A, a traditional compilation method is shown as flow diagram 100 which loops through the bytecode instructions, analyzing an individual bytecode instruction during each loop as stated in step 102. After each bytecode instruction is analyzed, the method determines the stack status from the bytecode instruction being analyzed and stores the stack status in stack status storage as stated in step 104. When the last bytecode instruction is analyzed as stated step 102, the loop is ended at step 108 and partial compilation is completed.

In prior art FIG. 1B, remaining compilation occurs in flow diagram 150 which shows further loops through the bytecode instructions analyzing an individual bytecode instruction during each loop as stated in step 152. The stack status storage and bytecode instruction are then used to translate the bytecode instruction into machine code as stated in step 154. When the last bytecode instruction is translated as stated in step 152, the loop is ended at step 158 and compilation is completed.

Figure 2A:
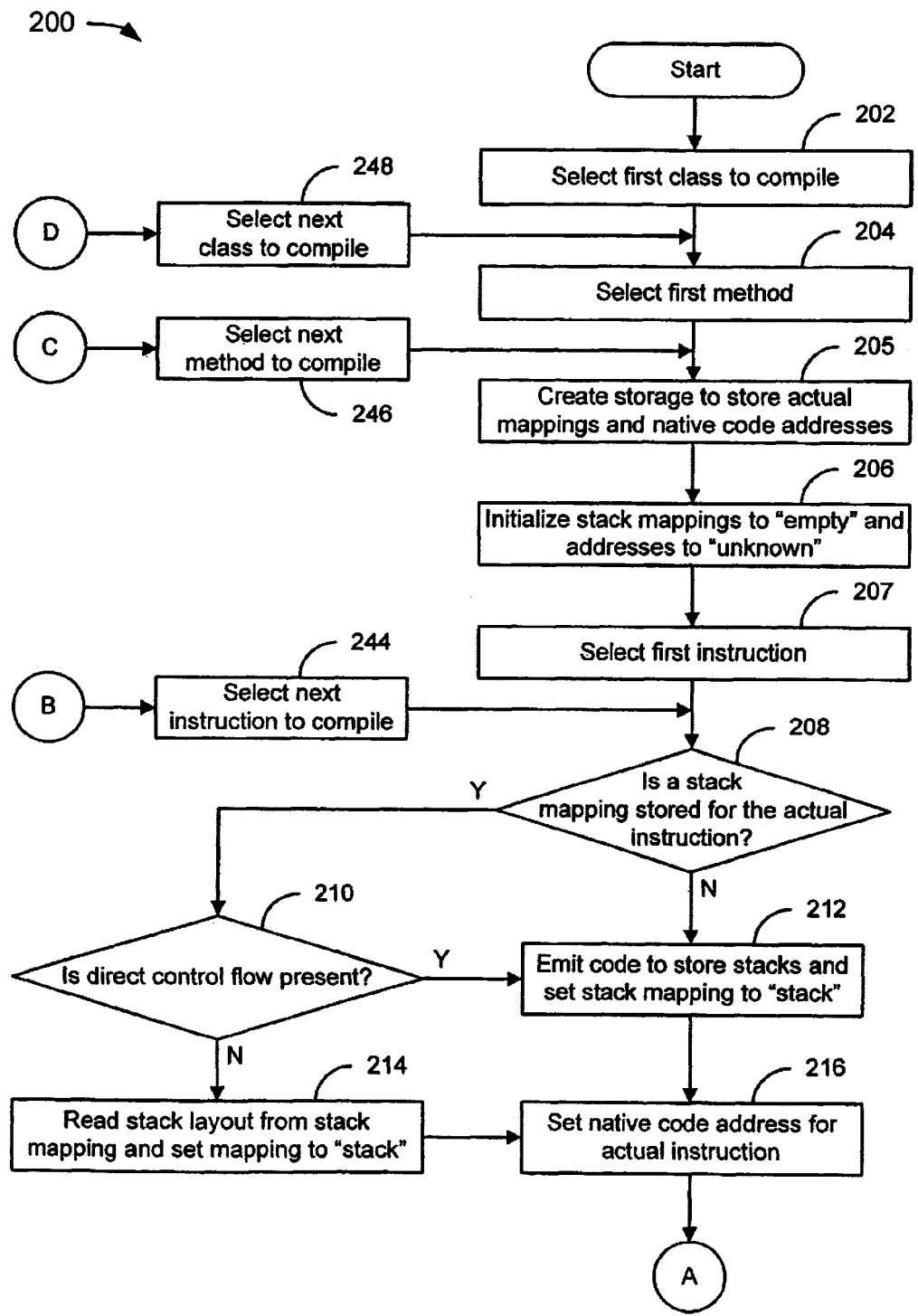
FIGS. 2A and 2B depict a flowchart of an embodiment of the new method.
Figure 2B:
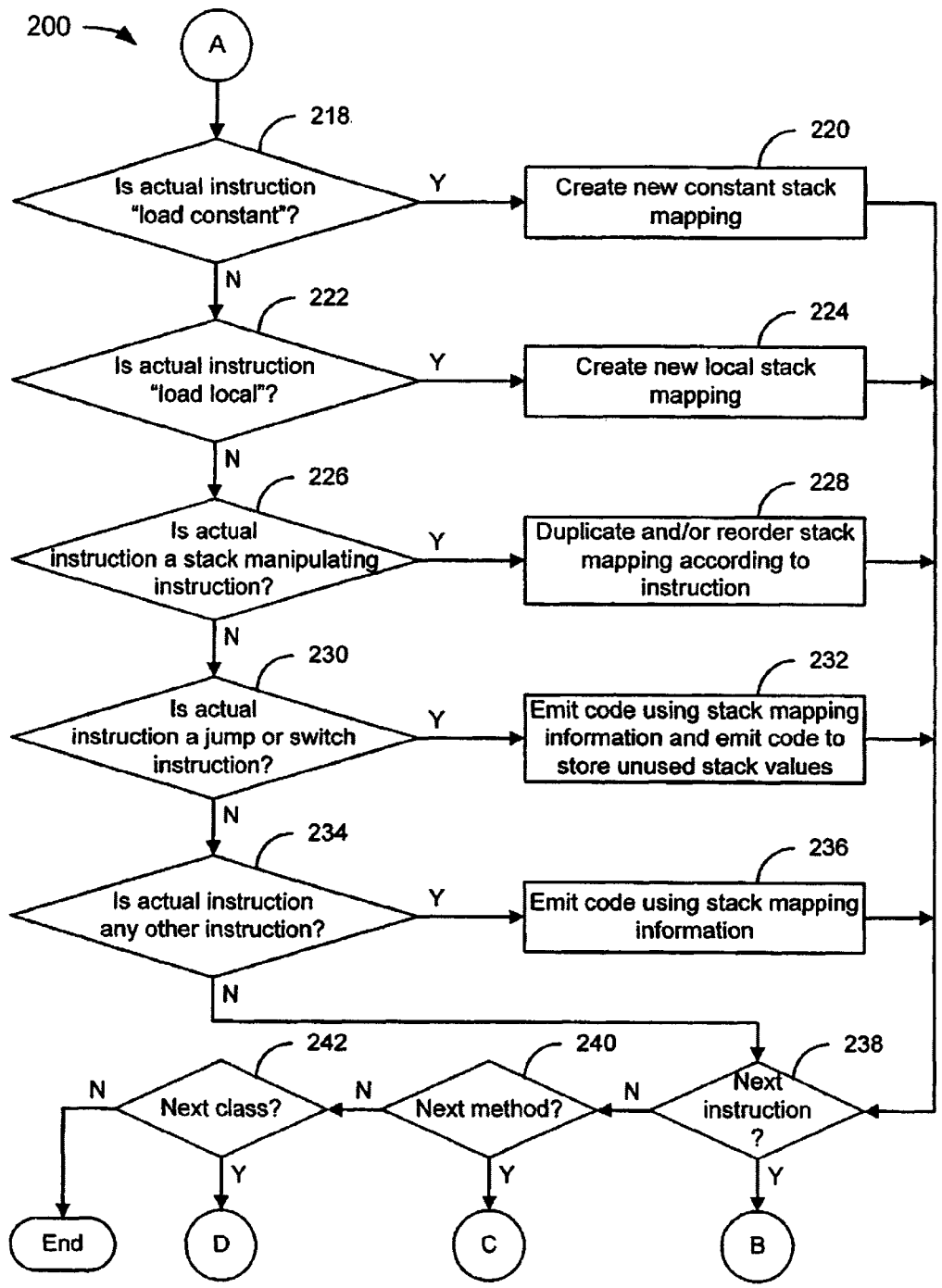

FIGS. 2A and 2B depict an illustrative flow diagram 200 of an embodiment of the new method. In step 202, a class file placed on the development or target system is selected. In step 204, a first method within the first class file is selected. In step 205, storage is allocated to facilitate storage of actual stack mappings and native code addresses. In step 206, stack mappings are initialized to "empty" and addresses are initialized to "unknown". In step 207, a first bytecode instruction is selected and evaluated. At decision block 208, it is determined whether there is a stack mapping stored for the actual bytecode instruction. If there is a stored stack mapping (208-Y), then at decision block 210 it is determined whether direct control flow from the previous instruction is present. If direct control flow is present (210-Y) or if there is not a stored stack mapping (208-N), then at step 212 code is emitted to store all stacks and set their stack mappings to 'stack'. If direct control flow is not present (210-N), then at step 214 stack layout is read from the stack mapping and mapping is set to stack. After either step 212 or step 214, in step 216, the native code address for the actual instruction is set.

In an embodiment, the flowchart 200 continues at decision block 218 where it is determined whether the instruction is "load constant". If the instruction is "load constant" (218-Y), then at step 220 a new constant stack mapping is created and the flowchart 200 continues from decision block 238, which is described later. If the instruction is not "load constant" (218-N), then at decision block 222 it is determined whether the instruction is "load local". If the instruction is "load local" (222-Y), then at step 224 a new local stack mapping is created and the flowchart 200 continues from decision block 238. If the instruction is not "load local" (222-N), then at decision block 226 it is determined whether the instruction is a stack manipulating instruction. If the instruction is a stack manipulating instruction (226-Y), then at step 228 the stack mapping is duplicated and/or reordered according to the instruction and the flowchart 200 continues from decision block 238. If the instruction is not a stack manipulating instruction (226-N), then at step 230 it is determined whether the instruction is a jump or switch instruction. If the instruction is a jump or switch instruction (230-Y), then at step 232 a code is emitted using the stack mapping information, at step 234 a code is emitted to store unused stack values, and the flowchart 200 continues from decision block 238. It should be noted that unused stack values, as used herein, are the values represented in the various stacks that have not yet been translated into codes. If the instruction is not a jump or switch instruction (230-N), then at step 236 a code is emitted using stack mapping information to locate the arguments and the flowchart 200 continues at decision block 238. The mappings for the arguments are removed and new mappings are created if the instruction results in a new value.

In an embodiment, the flowchart 200 continues at decision block 238 where it is determined whether a next instruction is available. If a next instruction is available (238-Y), then at step 244 the next instruction is selected and the flowchart 200 continues from decision point 208, described previously. If a next instruction is not available (238-N), for example because the instruction is a last instruction of a method or a class, then the flowchart 200 continues at decision block 240 where it is determined whether a next method is available. If a next method is available (240-Y), then at step 246 the next method is selected and the flowchart 200 continues from step 205, described previously. If a next method is not available (240-N), for example because the method was the last method of a class, then the flowchart 200 continues at decision block 242 where it is determined whether a next class is available. If a next class is available (242-Y), then at step 248 the next class is selected and the flowchart 200 continues from step 204, described previously. If a next class is not available (242-N), then it is assumed in this embodiment that each instruction of each method of each class has been processed and the flowchart 200 ends.

It should be noted that decision blocks need not indicate a decision is made at each block. For example, a determination of whether the instruction is a "load constant" (see, e.g., decision block 218 of FIG. 2B) or a "load local" (see, e.g., decision block 222 of FIG. 2B) could be made as a single decision, rather than two separate decisions. This method and other methods are depicted as serially arranged modules. However, modules of the methods may be reordered, combined, or arranged for parallel execution as appropriate.

Several data structures are required to remember the information of the preceding instruction translation in the new method. For each possible value currently available on the bytecode stack, a field is required showing the actual mapping to storage locations in the target machine architecture, as well as a field containing additional information on the first field. A field showing actual mapping to storage locations is required for constants, locals, temporaries and stacks. The second field contains additional information such as constant values, slot and register numbers. For each bytecode address which is the target of a jump or switch instruction, an additional field is required to store the corresponding native address code.

Referring now to FIG. 3, an embodiment of the new fast compilation method may be executed on a development or target system that includes one or more class files. A class file contains one or more methods with bytecode instructions. According to an embodiment, the bytecode instructions of each method are analyzed. Storage and data structures for actual mappings and native code addresses are created and the stack mappings are initialized to "empty" and addresses are initialized to "unknown". Each bytecode instruction, from first to last is then evaluated and translated into high quality machine code.

Each bytecode instruction is evaluated sequentially from first to last, and starting with the first, the new method determines if there is a stack map stored for the actual bytecode instruction. If a stack map is stored for the actual instruction, the new method then determines if there is direct control flow from the previous instruction (for each bytecode instruction after the first). If direct control flow exists, a code is produced to store all stacks and set their stack mapping to 'stack'. If no direct control flow exists, the stack layout in bytecode is read from the stack map and mappings are set to 'stack'. Once the code is produced or stack layout is read, the native code address is set for the actual instruction.

The sequential bytecode instructions are then evaluated to determine if the actual instruction is 'load constant', 'load local', a stack manipulating instruction, a jump, switch or any other instruction. If the actual instruction is load constant a new constant stack mapping is created. If however, the actual instruction is load local, new local stack mapping is created.

If the actual instruction is a stack manipulating instruction such as pop, pop2, dup, dup_x1, dup_x2, dup2, dup2_x1, dup2_x2, or swap, stack mappings are duplicated or reordered according to the actual instruction. If the actual instruction is a jump or switch instruction, a code is produced for the actual instruction using stack mapping information to locate the arguments and native code addresses to get the actual destination address and the mappings for the arguments are removed. A code is also produced to store all stack values not used by this instruction and their stack mapping is set to 'stack'.

If the actual instruction is any other instruction, a code is produced for the actual instruction using stack mapping information to locate the arguments. The mappings for the arguments are removed and a new mapping is created if the instruction results in a new value. The process is repeated for each method within each class file, and thereafter repeated for each class file.

prior art methods such as simple translators and optimizing compilers fail to produce the results associated with the new method. Through the use of a sequential pass, the simplicity and speed of simple translators is achieved. As used herein, the language "mimic an optimizing compiler" refers to the utilization of information from the translation of preceding bytecodes to compile a sequence of bytecodes into machine code in a sequential pass, an example of which is described above with reference to FIGS. 2A and 2B. As used herein, the language "using information from preceding instructions" refers to using information that is stored in stacks as described, for example, with reference to FIGS. 2A and 2B, when processing a current bytecode. Data structures appropriate for utilization in this regard are conceptually depicted, for example, in FIG. 3. However the use of preceding translation information to mimic optimizing compilers when possible, creates the high quality machine code translation characteristic of an optimizing compiler. Therefore the present invention produces a high quality translation with greater simplicity and speed than previously known.

I claim:

1. A computer apparatus suitable for use in a fast compilation of preverified platform neutral bytecode instructions resulting in high quality native machine code, comprising:
   a central processing unit (CPU);
   a computer memory coupled to said CPU, said computer memory comprised of a computer readable medium;
   a compilation program embodied on said computer readable medium, said compilation program comprising:
      a first code segment that receives a class file listing including bytecode;
      a second code segment that creates optimized machine code from said bytecode in a single sequential pass in which information from preceding instruction translations is used to perform the same optimizing process of an optimizing compiler without the extensive memory and time requirements; and
      a third code segment that interprets and executes said machine code.

2. The method of claim 1, further comprising mimicking an optimizing compiler.

3. A computer apparatus suitable for use in the first compilation of preverified platform neutral bytecode instructions resulting in high quality native machine code, comprising:
   a development or target computer system, said development or target computer system comprised of a computer readable storage medium containing a compilation program and one or more class files, said one or more class files containing one or more methods containing bytecode instruction listings;
   said compilation program contained on said storage medium comprised of a first plurality of instructions, said first-plurality of instructions executed sequentially for each bytecode instruction, said first plurality configured to select first class to compile;
   said compilation program contained on said storage medium comprised of a second plurality of instructions, said second plurality configured to select first method of said first class to compile;
   said compilation program contained on said storage medium comprised of a third plurality of instructions, said third plurality configured to create map storage to store actual mappings and native code addresses and initialize stack mappings to "empty" and addresses to "unknown";

said compilation program contained on said storage medium comprised of a fourth plurality of instructions, said fourth plurality configured to sequentially select each bytecode instruction in each said method of each of said one or more class files;

said compilation program contained on said storage medium comprised of a fifth plurality of instructions, said fifth plurality configured to detect stored stack mappings for said selected bytecode instruction;

said compilation program contained on said storage medium comprised of a sixth plurality of instructions, said sixth plurality configured to detect direct control flow from a bytecode instruction previous to said selected bytecode instruction, said detection of direct control flow from said previous bytecode instruction resulting in said sixth plurality of instructions storing all stacks and setting said stack mappings to "stack", lack of said detection of said direct control flow from said previous bytecode instruction resulting in said sixth plurality of instructions reading stack layout from said stack mappings and setting said stack mappings to "stack";

said compilation program contained on said storage medium comprised of a seventh plurality of instructions, said seventh plurality configured to set said native code address for actual instruction;

said compilation program contained on said storage medium comprised of an eighth plurality of instructions, said eighth plurality configured to detect if said actual instruction is a load constant instruction, said detection of load constant instruction resulting in said eighth plurality of instructions creating new constant stack mapping;

said compilation program contained on said storage medium comprised of a ninth plurality of instructions, said ninth plurality configured to detect if said actual instruction is a load local instruction, said detection of load local instruction resulting in said ninth plurality of instructions creating new local stack mapping;

said compilation program contained on said storage medium comprised of a tenth plurality of instructions, said tenth plurality configured to detect if said actual instruction is a stack manipulating instruction, said detection of stack manipulating instruction resulting in said tenth plurality of instructions duplicating or reordering said stack mapping according to said stack manipulating instruction;

said compilation program contained on said storage medium comprised of an eleventh plurality of instructions, said eleventh plurality configured to detect if said actual instruction is a jump or switch instruction, said detection of jump or switch instruction resulting in said eleventh plurality of instructions emitting code using said stack mapping information and storing unused stack values;

said compilation program contained on said storage medium comprised of a twelfth plurality of instructions, said twelfth plurality configured to detect if said actual instruction is a remaining type of instruction, said detection of remaining type of instruction resulting in said twelfth plurality of instructions emitting code using said stack mapping information;

said compilation program contained on said storage medium comprised of a thirteenth plurality of instructions, said thirteenth plurality configured to select next instruction;

said compilation program contained on said storage medium comprised of a fourteenth plurality of instructions, said fourteenth plurality configured to select next method; and said compilation program contained on said storage medium comprised of a fifteenth plurality of instruction, said fifteenth plurality configured to select next class file.

4. A computer implemented method for compilation of preverified platform neutral bytecode instructions resulting in high quality native machine code, comprising:

receiving a class file onto a computer readable medium containing compilation procedure instructions, said class file containing one or more methods containing platform neutral bytecode listing;

executing said compilation procedure instructions on said bytecode listings, said compilation procedures instructions sequentially processing each bytecode instruction of said bytecode listings; and producing native machine code on said computer readable medium, using preceding translation information to optimize said native machine code; and producing said native machine code in a single sequential pass in which information from preceding instruction translation is used to perform the same optimizing process of an optimizing compiler without the extensive memory and time requirements.

5. A computer implemented method as recited in claim 4 further comprising selecting first class to compile.

6. A computer implemented method as recited in claim 5 further comprising selecting first method of said first class to compile.

7. A computer implemented method as recited in claim 4 further comprising creating map storage to store actual mappings and native code addresses and initializing stack mappings to "empty" and addresses to "unknown".

8. A computer implemented method as recited in claim 4 further comprising sequentially selecting each said method of each said class file.

9. A computer implemented method as recited in claim 4 further comprising detecting stack mappings for said sequentially processed bytecode instructions.

10. A computer implemented method as recited in claim 4 further comprising detecting direct control flow from a bytecode instruction previous to a selected actual bytecode instruction, said detection of direct control flow from said previous bytecode instruction resulting in storing all stacks and setting stack mappings to "stack", lack of said detection of said direct control flow from said previous bytecode instruction resulting in reading stack layout from said stack mappings and setting said stack mappings to "stack".

11. A computer implemented method as recited in claim 4 further comprising setting a native code address for an actual instruction.

12. A computer implemented method as recited in claim 11 further comprising detecting if said actual instruction is a load constant instruction, said detection of load constant instruction resulting in said method creating new constant stack mapping.

13. A computer implemented method as recited in claim 11 further comprising detecting if said actual instruction is a load local instruction, said detection of load local instruction resulting in said method creating new local stack mapping.

14. A computer implemented method as recited in claim 11 further comprising detecting if said actual instruction is a stack manipulating instruction, said detection of stack manipulating instruction resulting in said method duplicating or reordering a stack mapping according to stack manipulation instruction.

15. A computer implemented method as recited in claim 11 further comprising detecting if said actual instruction is a jump or switch instruction, said detection or jump or switch instruction resulting in said method emitting native machine code using stack mapping information and storing unused stack values.

16. A computer implemented method as recited in claim 11 further comprising detecting if said actual instruction is a remaining type of instruction, said detection of remaining type of instruction resulting in said method emitting native machine code using stack mapping information.

17. A computer implemented method as recited in claim 11 further comprising selecting a next instruction.

18. A computer implemented method as recited in claim 11 further comprising selecting a next method.

19. A computer implemented method as recited in claim 11 further comprising selecting a next class file.

20. A computer implemented method, comprising:

processing a first bytecode of a sequence of bytecodes;

processing a second bytecode of the sequence of bytecodes using information resulting from the processing of the first bytecode; and producing optimized native machine code in a single pass through the sequence of the bytecodes, using preceding translation information to optimize the native machine code.

21. The method of claim 20, further comprising mimicking an optimizing compiler.

22. The method of claim 20, further comprising using information from previously processed bytecodes of the sequence of bytecodes to mimic an optimizing compiler.

* * * * *